United States Patent
Anderson

(10) Patent No.: US 10,375,081 B2
(45) Date of Patent: Aug. 6, 2019

(54) TECHNIQUES AND SYSTEM FOR EXTENDED AUTHENTICATION

(71) Applicant: INTEL CORPORATION, Santa Clara, CA (US)

(72) Inventor: Glen J. Anderson, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/459,216

(22) Filed: Aug. 13, 2014

(65) Prior Publication Data
US 2016/0050204 A1 Feb. 18, 2016

(51) Int. Cl.
H04L 29/06 (2006.01)

(52) U.S. Cl.
CPC ........ H04L 63/104 (2013.01); H04L 63/0853 (2013.01)

(58) Field of Classification Search
CPC ...... G06Q 50/22; G06Q 50/24; G06F 19/322; G06F 19/3418; G06F 19/3475; G06F 19/3456; G06F 19/3406; G06F 1/163; H04L 63/0876; H04L 63/0861; H04L 63/20; H04L 63/0853; H04L 63/104
See application file for complete search history.

(56) References Cited

U.S. PATENT DOCUMENTS

| 8,371,501 | B1 | 2/2013 | Hopkins |
| 8,467,770 | B1 | 6/2013 | Ayed |
| 2007/0207793 | A1* | 9/2007 | Myer .................... H04B 1/385 455/419 |
| 2008/0216171 | A1 | 9/2008 | Sano et al. |
| 2009/0058611 | A1 | 3/2009 | Kawamura et al. |
| 2010/0033303 | A1 | 2/2010 | Dugan et al. |
| 2011/0152970 | A1* | 6/2011 | Jollota ................. H04W 4/005 607/60 |

(Continued)

FOREIGN PATENT DOCUMENTS

| EP | 2378748 | | 10/2011 | |
| WO | WO2012042437 | * | 4/2012 | ............. G06F 19/00 |
| WO | WO 2013/096954 | * | 6/2013 | ............. G06Q 50/22 |

OTHER PUBLICATIONS

Goodin, Daniel, "Risk Assessment / Security & Hacktivism—Brave New World—medical devices use biometrics to prevent hack attacks", <http://arstechnica.com/security/2012/08/medical-device-hack-attacks/>, Aug. 7, 2012, 3 pages.

(Continued)

Primary Examiner — Catherine Thiaw

(57) ABSTRACT

An apparatus may include a memory to store authentication information for authenticating to a device group and a wearable device identifier for an unauthenticated device, a communications interface to transmit a probe signal over a local communication path and receive a reply message to the probe signal, and a device authentication module. The device authentication module may be to monitor the reply message, and schedule transmission of the authentication information over the local communication path when the reply message comprises the device identifier and a proximity indicator that identifies a local origin of the reply message.

21 Claims, 10 Drawing Sheets

(56) References Cited

U.S. PATENT DOCUMENTS

| | | | | |
|---|---|---|---|---|
| 2011/0269414 A1* | 11/2011 | Falck | ............... | A61B 5/0028 455/100 |
| 2012/0051314 A1* | 3/2012 | Goyal | ............... | H04L 9/0833 370/329 |
| 2012/0119902 A1* | 5/2012 | Patro | ............... | H04L 12/12 340/502 |
| 2013/0006650 A1* | 1/2013 | Bocirnea | ............... | G06Q 10/10 705/2 |
| 2014/0279528 A1* | 9/2014 | Slaby | ............... | H04L 63/0853 705/44 |
| 2014/0300490 A1 | 10/2014 | Kotz et al. | | |
| 2015/0046996 A1* | 2/2015 | Slaby | ............... | H04L 63/08 726/7 |
| 2015/0062022 A1* | 3/2015 | Rabii | ............... | G06T 1/20 345/173 |
| 2015/0074797 A1* | 3/2015 | Choi | ............... | G06F 21/32 726/19 |
| 2015/0141005 A1* | 5/2015 | Suryavanshi | ......... | H04L 67/125 455/434 |
| 2015/0147065 A1* | 5/2015 | Civelli | ............... | G08C 23/04 398/107 |
| 2015/0149924 A1 | 5/2015 | Tsai et al. | | |
| 2015/0150505 A1* | 6/2015 | Kaskoun | ............... | A61B 5/6833 600/300 |
| 2015/0186636 A1* | 7/2015 | Tharappel | ............... | G06F 21/32 726/8 |
| 2015/0201439 A1* | 7/2015 | Park | ............... | H04W 76/026 370/338 |
| 2015/0286813 A1* | 10/2015 | Jakobsson | ............... | G06F 21/35 726/9 |
| 2015/0289820 A1* | 10/2015 | Miller | ............... | A61B 5/7221 600/300 |
| 2016/0259926 A1* | 9/2016 | strand | ............... | G06F 3/014 |
| 2017/0041789 A1* | 2/2017 | Waldron | ............... | G06K 19/0716 |

OTHER PUBLICATIONS

International Search Report and Written Opinion received for PCT Patent Application No. PCT/US2015/037625, dated Oct. 7, 2015, 13 pages.

Extended European Search Report received for European Patent Application No. 15831413.8, dated Feb. 16, 2018, 3 pages.

\* cited by examiner

TECHNIQUES AND SYSTEM FOR EXTENDED AUTHENTICATION

TECHNICAL FIELD

The present embodiments are related to authentication of devices for communications among multiple devices.

BACKGROUND

As the number of communications and computing devices that a user may routinely own or access increases, the ability to manage communications between and access to multiple devices faces several challenges. In order to authenticate to a device that has access protection, it may be required to enter authentication information in a manual fashion including device identifiers and password information. It therefore may be useful to improve authentication procedures when a user is to authenticate to more than one device in order to reduce the time consumed by authentication. In many instances authentication may entail a set of procedures that are designed to provide a very high level of security to establish that a party authenticating to a device is to be trusted. However, in some circumstances a user may not need or desire to impart a high level of security for protecting access to one or more devices. On the other hand, for many devices at least some level of access protection may be desired, which often results in a circumstance in which an overly cumbersome security procedure is involved for authentication to user devices.

It is with respect to these and other considerations that the present improvements may be needed.

DETAILED DESCRIPTION

The present embodiments provide apparatus, systems and techniques for extended authentication to a device, group of devices, or network of devices. In various embodiments, extended authentication is provided in an automated or semi-automated manner that involves little or no user input to extend authentication to new devices that facilitate access to other devices.

Various embodiments may be employed in scenarios in which access to a device or group of devices is already established. In some embodiments, access to a group of devices (also referred to herein as "device group") may be mediated by a wearable user device that provides automatic access to the group of devices once a set of authentication procedures has been performed. The embodiments of the present disclosure may extend authentication by facilitating access to a device group through additional devices once an initial device has been authenticated to the device network via user input.

Figure 1:
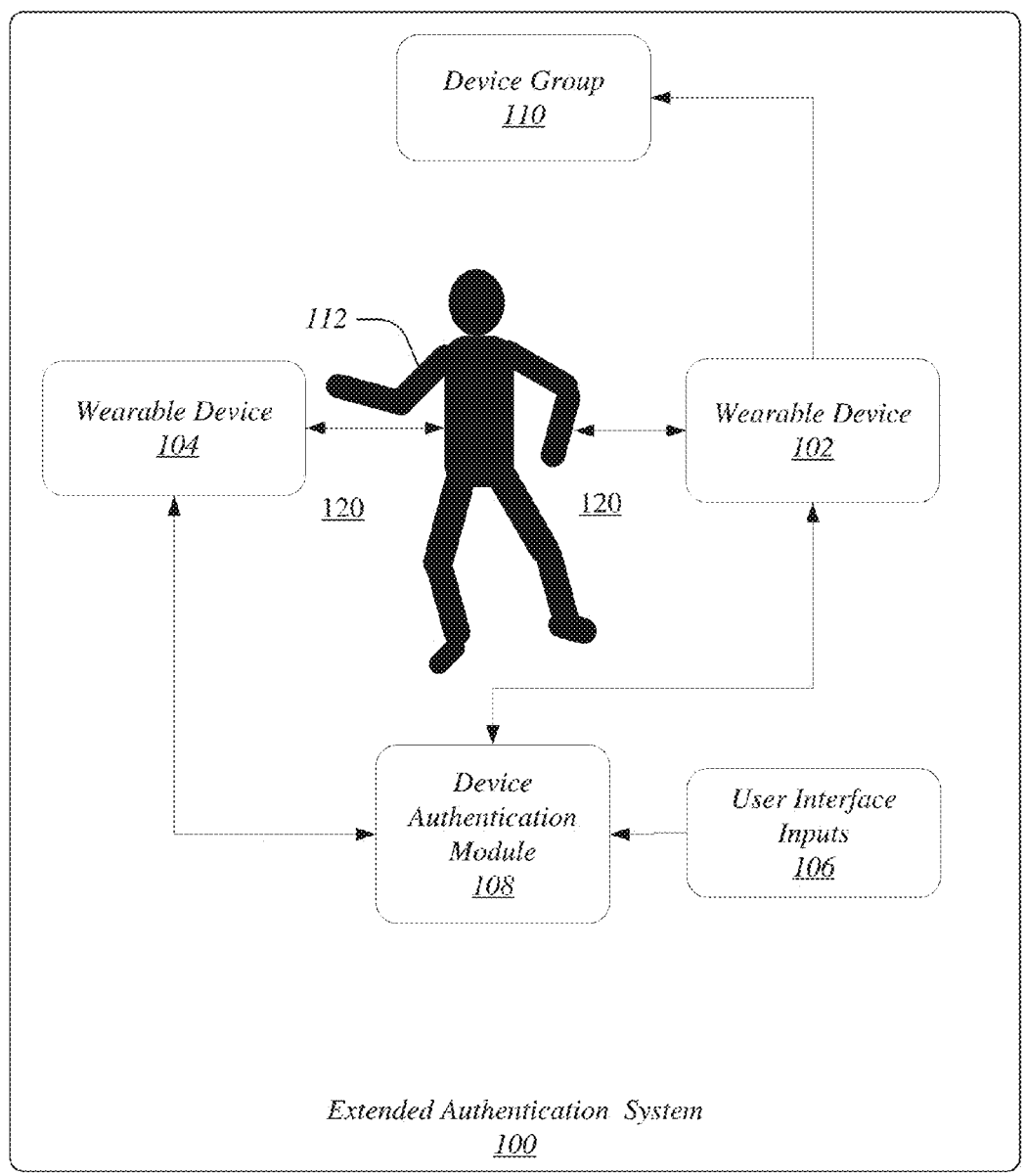
FIG. 1 illustrates a block diagram of an extended authentication system according to various embodiments.

In various embodiments, the initial device and additional devices that are used to authenticate to a device group may wearable devices that are designed to be worn by a user or held by the user. Various embodiments facilitate automatic access to a device of a device group when a user wears the authenticated device. As detailed in the embodiments to follow, once an initial wearable device is authenticated to a device group, additional wearable devices may be authenticated to the device group without performing the authentication procedure performed for the initial wearable device. In particular embodiments, as detailed below, an additional wearable device may be authenticated automatically when a user dons the additional wearable device FIG. 1 illustrates a block diagram of an extended authentication system 100 according to various embodiments. The extended authentication system 100 provides a general architecture that may be implemented in different manners to automatically extend authentication to devices such as wearable devices, where the authentication provides access and communications to a device group 110. As illustrated in FIG. 1, the device group 110 may be a group of devices controlled by a user.

The term "device group" as used herein refers to at least one device that requires authentication in order to access or perform certain tasks with that device or group of devices. A device group such as device group 110 may be configured to provide access when a given set of authentication procedures is performed. A device group may be arranged as a device network that includes multiple devices in which at least some devices are configured to communicate between one another. Alternatively, a device group may include multiple devices in which at least some of the devices do not communicate with one another.

In some embodiments a single set of authentication procedures may be performed to access or authenticate to the different devices of a device group. For example, a single set of authentication information such as passwords, codes, encryption/decryption keys, and so forth, may be employed to authenticate to different devices of a device group. In many scenarios a user may manage many different devices in a device group such as device 110, where authentication is used to access each device of the device group. Accordingly, it may be useful to limit the number of manual authentication procedures performed by a user in order to obtain and maintain access to different devices of a device group. The extended authentication system 100 facilitates reduction in manual authentication by providing apparatus and architecture that automatically authenticates additional devices to a device group 110 once a first authentication procedure is performed, which may be conducted in a manual fashion.

As shown in FIG. 1, a wearable device 102 and wearable device 104 are provided. Examples of a wearable device include a watch device, a head mounted device, other wrist device, a shoe device, a hat, a belt, or a device embedded in a fabric to be worn such as a shirt. The embodiments are not limited in this context. In some implementations, the user may authenticate to the device group 110 with the aid of the wearable device 102. For example, to authenticate to one or more devices of the device group 110 a user may enter logon/authentication information through a user interface of a device such as a computer, smartphone, tablet computer, or other device, which may be part of the device group 110. The user 112 may authenticate the wearable device 102 to at least some devices of the device group 110 by different means. For example, a user 112 may don the wearable device 102, which is detected by a personal computer (not shown) when the user 112 logs onto the personal computer. The detection may be performed by electrical conduction, wireless communications, near field communications, or other technique. Once logged onto the personal computer while wearing the wearable device 102, the user 112 may be authenticated to other devices within the device group 110. In other words, the personal computer may provide a signal or message to devices of the device group 110 that identifies the wearable device 102. Accordingly, when a user 112 accesses a given device of the device group 110 while wearing the wearable device 102, the wearable device 102 may be detected and the user 112 may be authenticated to the given device without the need to provide authentication information.

In other implementations, the wearable device 102 may be coupled to a user interface in another device such as a computer or may include a user interface (not shown) that allows a user 112 to authenticate the wearable device 102 to devices of the device group 110 by manually entering authentication information through a user interface in the wearable device 102. Once authenticated via manual entry of authentication information to a given device, the user 112 may remain authenticated to the given device while wearing the wearable device 102. The user 112 may also be automatically authenticated to other devices of the device group 110 while wearing the wearable device 102 if those other devices are in communication with the given device used for manual authentication.

In the above scenarios, once a user removes the wearable device 102, authentication with one or more devices of the device group 110 may be terminated. In other words, when a user interacts with a given device of the device group 110, for the user to be automatically authenticated to the given device it may be necessary that the wearable device 102 is operated in a proper configuration in which the wearable device 102 is typically worn. This may be inconvenient for a user 112 because it may force the user 112 to continue wearing the wearable device 102 for automatic access to devices of the device group 110, even when it is not desirable to continue wearing the wearable device 102. In some circumstances the wearable device 102 may become inadvertently disengaged from the user 112, such as when a wrist mounted device falls off or becomes unclasped. In these circumstances automatic authentication to devices of the device group 110 may be lost.

Various embodiments address this situation by extending authentication to additional devices such as the wearable device 104. In accordance with some embodiments, the wearable device 104 may communicate with the wearable device 102 via a local communication path 120. The local communication path 120 may be composed of an electrically conductive surface that may transport electrical signals between the wearable device 102 and wearable device 104. These electrical signals may provide information that is used to authenticate the wearable device 104, for example. In particular embodiments, the local communication path 120 may be composed of a skin surface of the user 112, which may be sufficiently conductive to carry electrical signals between the wearable device 104 and wearable device 102.

In some embodiments, the local communication path 120 may be a wireless communications link, which may operate according to known wireless technology standards, such as a Bluetooth® (Bluetooth is a trademark of the Bluetooth Special Interest Group), Ant+ (ANT+ is a trademark of Garmin Ltd., Dynastream Innovations, Inc. or its companies), or other standard. In other embodiments, the local communication path 120 may involve near field communications technology. The embodiments are not limited in this context.

As discussed below, in various embodiments a communications link may be established between wearable device 102 and wearable device 104, such as over the local communication path 120, when the user 112 dons the wearable device 104 or otherwise interacts with the wearable device 104 while already wearing the wearable device 102. In some embodiments the wearable device 102 may automatically provide authentication information to the wearable device 104 when the user 112 dons the wearable device 104. In some implementations, this authentication information may allow the user 112 to authenticate to devices of the device group 110 via the wearable device 104 without manual entry of authentication information. In this manner, the user 112 is provided with an additional device, wearable device 104, with which to authenticate to various other devices that may form part of the device group 110 without having to perform cumbersome authentication procedures.

As shown in FIG. 1, the extended authentication system 100 further includes a device authentication module 108. The device authentication module 108 may be included in one or more wearable devices such as the wearable device 104 and wearable device 102. Alternatively, or in addition, the device authentication module 108 may be implemented in another device (not shown) that is located locally or remotely with respect to the user 112, but communicatively coupled to the wearable device 102 and wearable device 104. The device authentication module 108 may be located, for example, in an authentication device that is linked to the device group 110 is part of the device group. In some implementations, the device authentication module 108 may be distributed among all of the aforementioned devices.

The device authentication module 108 may monitor and passively or actively manage certain procedures related to the extending of authentication between different devices such as wearable device 102 and wearable device 104. The device authentication module 108 may also manage procedures for maintaining authentication of a device or terminating or preventing authentication of a device. The device authentication module may also be coupled to a user interface inputs 106, which may provide manually entered input to assist the device authentication module in authentication procedures.

It is to be noted that the device authentication module 108 and other similar components as disclosed below, may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 2:
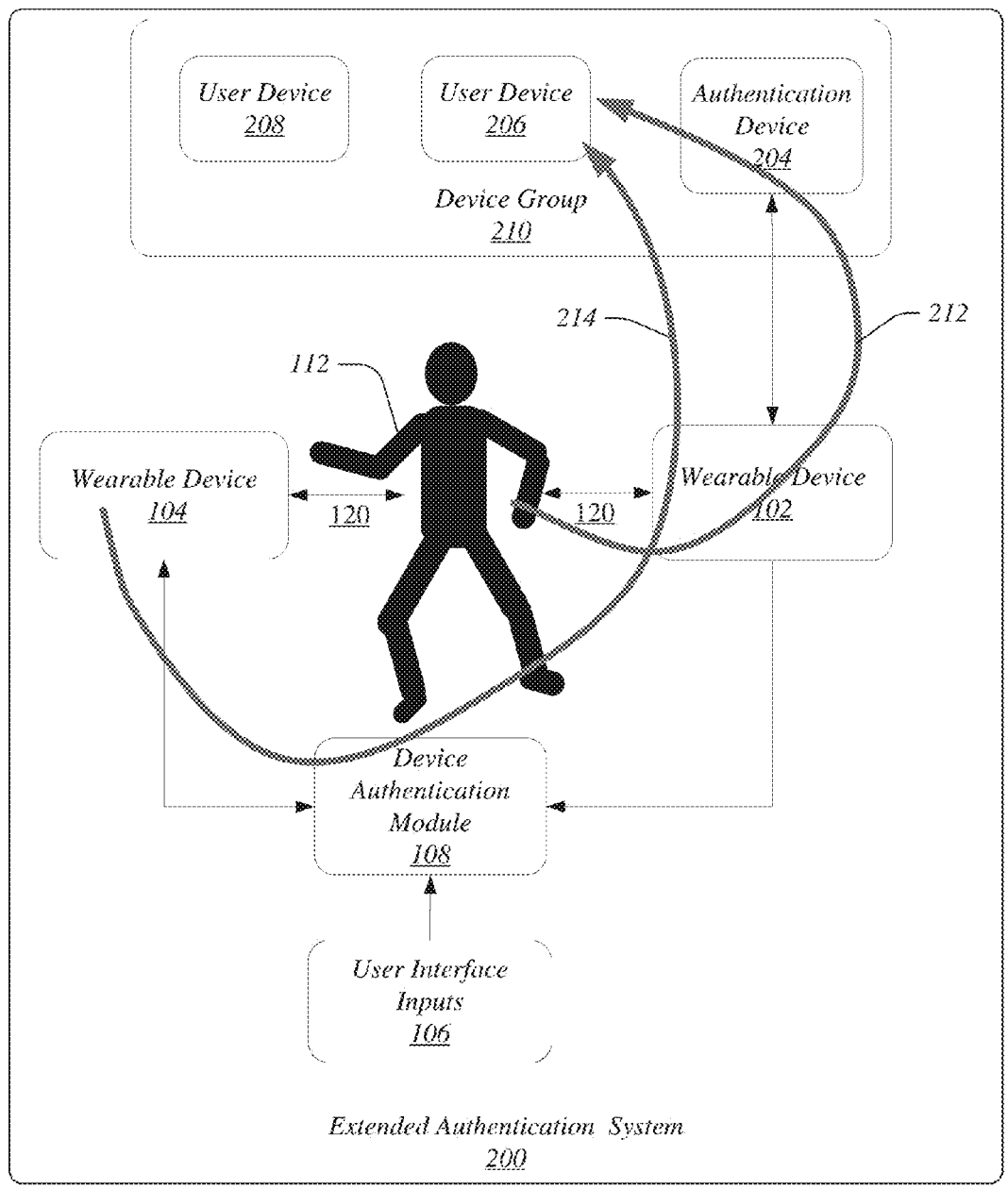
FIG. 2 illustrates a block diagram of another extended authentication system according to various additional embodiments.

FIG. 2 depicts an extended authentication system 200 according to additional embodiments. The extended authentication system 200 may be a variant of the extended authentication system 100. Details of one example of a device group 210 are shown. The device group 210 may include multiple user devices including a user device 206, user device 208 and an authentication device 204. In some implementations, devices of the device group 210 may be a personal computer, laptop computer, tablet computer, smartphone, tablet computer, phablet, or other device. Any or all of these devices may be arranged to prevent access unless provided with authentication information. The devices of device group 120 may be accessible to the user locally or remotely.

In one mode of operation, one or more of the devices of device group 210 may be accessed by manually entering authentication information through an appropriate user interface for that device. In another mode of operation, one or more devices of device group 210 may be accessed by manually entering authentication through a first device, but not necessarily through other devices of the device group 210. For example, an authentication device 204 may be included, which may be a personal computer or other device having a user interface suitable for manual entry of authentication information such as ID, password, and so forth. The authentication device 204 may be communicatively coupled via known techniques to other devices in device group 210, such as the user device 206 and user device 208. When a user 112 provides authentication information to the authentication device 204, the user may 112 may also be authenticated to other devices such as user device 206 and user device 208.

In one implementation that is outlined schematically in FIG. 2, a user 112 may manually enter authentication information into the authentication device 204 while wearing the wearable device 102. A communication link between the wearable device 102 and authentication device 204 may be set up such that the wearable device 102 is recognized by the authentication device 204. When the user 112 subsequently attempts to access the user device 206 while wearing the wearable device 102, the wearable device 102 may be automatically authenticated to the user device 206 and the user 112 may be permitted access to the user device 206 without manual entry of authentication information into the user device 206.

The authentication procedures involved in authenticating the wearable device 102 to the user device 206 is shown as an authentication path 212, and includes the use of the authentication device 204 for manual entry of authentication information. This authentication path may be extended to other devices of device group 210, such as user device 208. Authentication to other such devices may take place automatically when the user 112 is wearing the wearable device 102 such that the user 112 is permitted access to the devices of device group 210 without manual entry of authentication information.

However, as noted above, the user 112 may desire to remain authenticated to devices such as devices of device group 210 even if the wearable device 102 is removed or otherwise loses authentication to the device group 210. The wearable device 204 and device authentication module 108 may provide extended authentication that addresses such a situation. In particular, once the wearable device 102 is authenticated to the device group 210, the extended authentication module 108, wearable device 102, and wearable device 104 may operate to automatically authenticate the wearable device 104 to the device group 210.

Procedures and apparatus details for accomplishing this extended authentication are disclosed with respect to the figures to follow. However, FIG. 2 provides a schematic illustration of an authentication path 216 for extended authentication of the wearable device 104 so that the wearable device 104 is authenticated to the device group 110. The authentication path 216 includes the user 112, device authentication module 108 and wearable device 102. In one example, once the user 112 dons the wearable device 104 the wearable device 102 and wearable device 104 may conduct a series of communications that may be mediated by the device authentication module 108 and result in authentication of the wearable device 104 to the user device 206 of the device group 210. Although not specifically illustrated, the wearable device 104 may be automatically authenticated to other devices of the device group 210. As shown in FIG. 2, this extension of authentication to wearable device 104 via authentication path 214 does not entail manual entry of authentication information that may require use the authentication device 204, as in the case of authentication of wearable device 102 discussed above. Thus, once an initial device such as the wearable device 102 is authenticated, further authentication of a new wearable device to devices of device group 210 may be achieved without manual intervention of a user 112.

Figure 3:
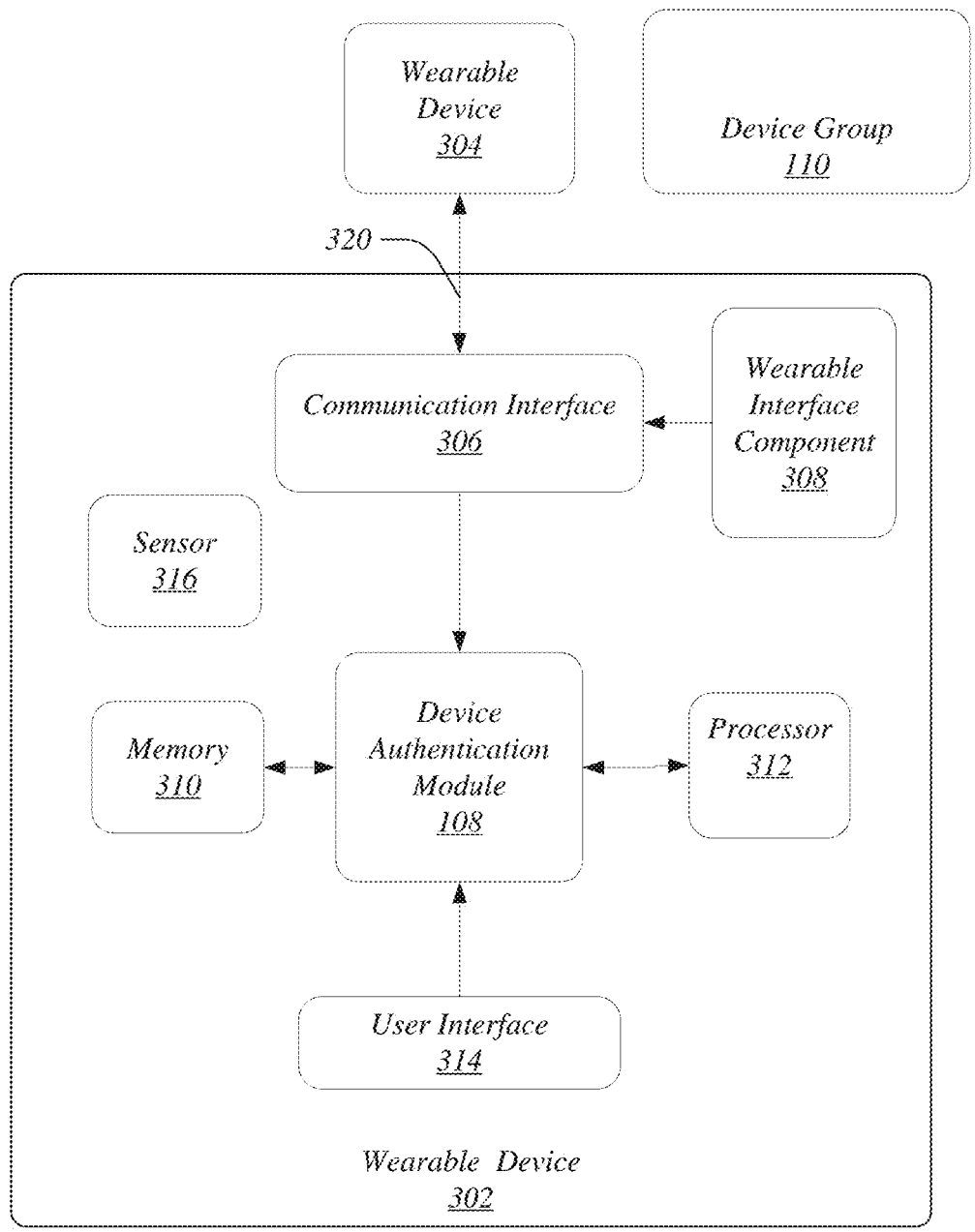
FIG. 3 illustrates a block diagram of a further extended authentication system according to various embodiments.

FIG. 3 provides details of an extended authentication system 300 arranged according to additional embodiments. In the extended authentication system 300 a wearable device 302 is coupled to a wearable device 304 over a local communication path 320. In some embodiments the local communication path 320 may be an electrically conductive path formed on the skin surface of a user (not shown). Thus, in one use scenario the wearable device 304 and wearable device 302 may communicate with each other when worn by a user. However, in other embodiments, the communication path may be a wireless communication link as noted previously. In the example of FIG. 3 various components of the wearable device 302 are illustrated. In some embodiments, one or more additional wearable device including the wearable device 304 may include similar components to those illustrated for wearable device 302.

The wearable device 302 includes a communications interface 306 to communicate with devices external to the wearable device 302. The communications interface 306 may include such components as electrical leads, transducers, radios, receiver or transmitter components, antennae, or other components to generate, conduct and receive signals including electromagnetic radiation, electrical signals, acoustic signals, or other signals.

The wearable device 302 also includes a memory 310, and a processor 312, which may include logic circuitry that is operative on the device authentication module 108. The wearable device 302 may further include a user interface 314, which may include a mouse, keyboard, keypad, touchpad, or touch screen, or other known component. The embodiments are not limited in this context. The wearable device 302 also includes a wearable interface component 308, which may serve to attach the wearable device 302 to a user in a first configuration and to detach the wearable device 302 in a second configuration. An example of a wearable interface component includes a clasp in a wrist mounted device that can be opened or closed. Another example of a wearable interface component 308 is a button or set of buttons in a shirt that is configured as a wearable device.

The wearable interface component 308 may operate to automatically generate a signal when it is in a first configuration such as when the wearable device 302 is an operating position when attached to a user, or may operate to automatically generate a signal when in a second configuration such as when the wearable device 302 is detached from a user, or may generate a signal in both configurations. In this context generating a signal may simply constitute, for example, creating a closed electrical circuit or creating an open electrical circuit either of which may be detected by other components.

In additional embodiments the wearable device 302 may include other components such as a sensor (not shown) that detects when the wearable device 302 is placed in a configuration that indicates that the wearable device is being donned by a user or taken off. Examples of such sensors include accelerometers, gyrometers, and so forth.

For the purposes of illustration it may be assumed in one scenario that the wearable device 302 is authenticated to devices of the device group 110. In operation, the wearable device 302 may be attached to a user and the wearable interface component may be placed in an operating configuration that constitutes a proper configuration to be worn, such as the closing of a clasp for a wrist mounted device. When placed in such an operating configuration, the wearable interface component 308 may generate an operation signal that triggers logic in the wearable device 302, such as the processor 312, to generate a probe signal and to be transmitted over the communication interface 306. In some embodiments, the operation signal may also trigger the wearable device 302 to search or scan for a signal from another device.

As further illustrated in FIG. 3, the wearable device 302 may include a sensor 316, which may monitor biometric signals and perform biometric measurements that are received from a user or wearer of the wearable device 302. These biometric measurements may include, for example, measurement of heartbeat, breathing, and so forth. In some embodiments, each of the aforementioned components of wearable device 302 may be included in wearable device 304.

In some scenarios when the wearable device 302 generates a probe signal a reply message may be received, such as from the wearable device 304. The wearable device 302 may automatically authenticate the wearable device 304 to the device group 110 based upon a reply message when certain criteria are met. For example, the device authentication module 108 may be employed to determine if the reply message from wearable device 304 provides a device identifier and whether the reply message includes or constitutes a proximity indicator. A proximity indicator may identify a local origin of the reply message, and more particularly may indicate that the wearable device 304 is being worn by a wearer of the wearable device 302.

Examples of a proximity indicator may include when a reply message is received as an electrical signal over an electrically conductive path that constitutes the local communications path. This electrically conductive path may be formed by the skin surface of a wearer of the wearable device 302 and wearable device 304. Thus, the communications interface 306 may include electrical probes that are configured to contact a wearer's skin and may receive a reply message from wearable device 304 as a set of electrical pulses. Under this circumstance, it may be deemed that the sending device of the reply message is attached to the body of the wearer of wearable device 302 and is therefore to be trusted.

As detailed below, another example of a proximity indicator in a reply message is biometric measurement information or biometric data that may indicate that the sending device of the reply message is attached to the body of the wearer of the wearable device 302. The embodiments are not limited in this context.

Figure 4:
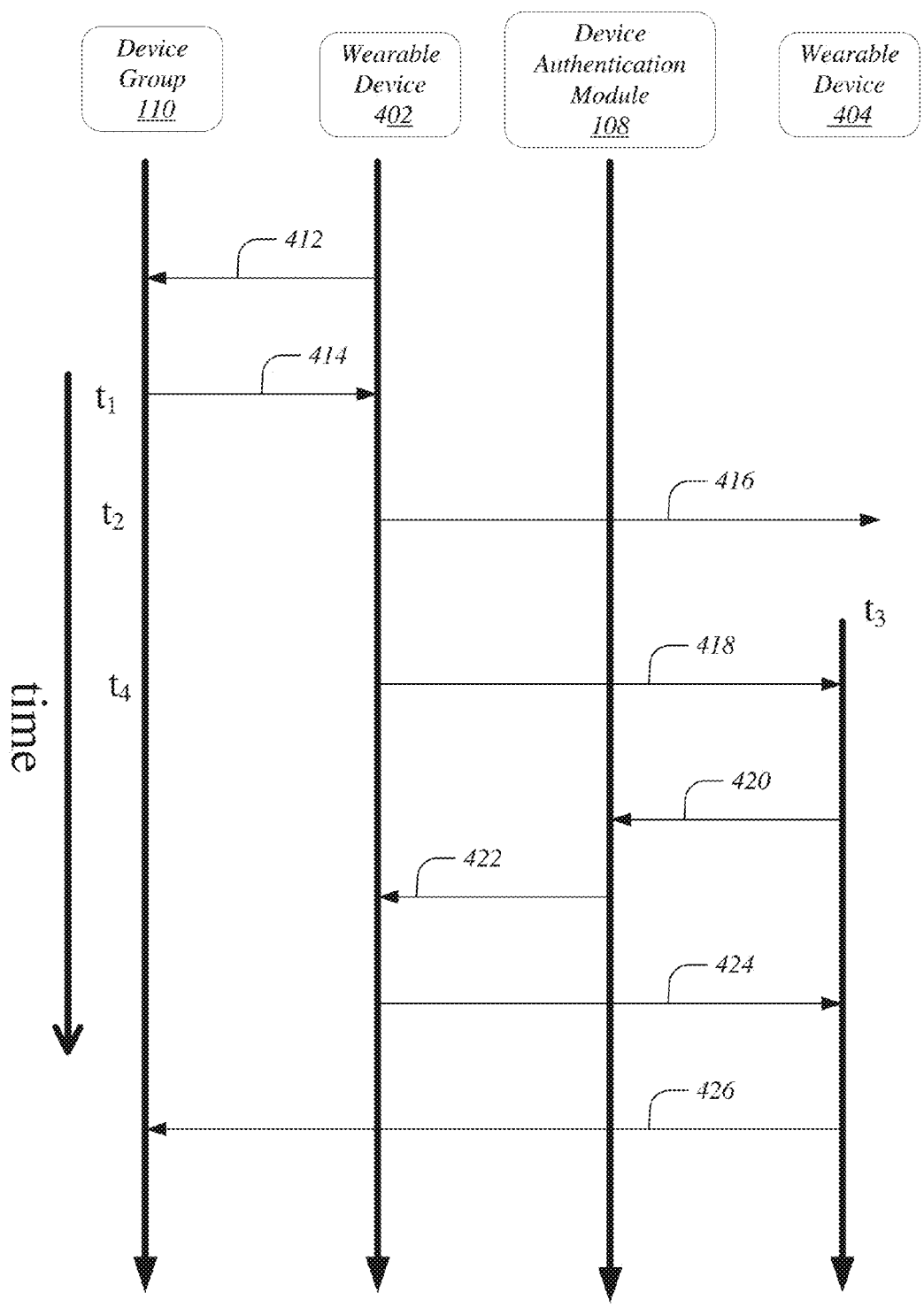
FIG. 4 provides an example of a sequence of operations to provide extended authentication in accordance with embodiments of the disclosure.

FIG. 4 provides an example of a sequence of operations for transmitting signals or communications to provide extended authentication in accordance with embodiments of the disclosure. These signals or communications are referred to herein as "messages." In the example of FIG. 4 there are shown two different wearable devices, wearable device 402 and wearable device 404, which may be configured similarly to the wearable device 304 discussed above. As illustrated time proceeds from top to bottom of the figure.

In the scenario of FIG. 4 it may be assumed that the wearable device 402 and wearable device 404 may be registered with a system that provides access to devices of the device group 110, which may represent any device associated with the device group 110 or all devices of the device group 110. For example, a user may register using a personal computer or other device a first serial number associated with the wearable device 402 and a second serial number associated with the wearable device 404. In some cases the wearable device 402 and wearable device 404 may be provided with information such as a decryption key to be used in communications to facilitate access to the device group 110 while preventing other unwanted devices from access to the device group 110.

After these preliminary tasks are performed, when a user subsequently wishes to establish convenient access to devices of the device group 110, an initial set of operations may be performed to authenticate a wearable device to the device group 110.

For example, a signal or message 412 may be sent from wearable device 402 to authenticate the wearable device 402 to the device group 110. The message 412 may identify the wearable device 402 to a device that provides access to the device group 110 in one example. The message 412 may result as a consequence of authentication information that is entered manually by a user of the wearable device 402, as described above. A return message 414 may be sent from the device group 110, for example, from a computer associated with the device group. The return message 414 that is sent at time $t_1$ may include authentication information that completes authentication of the wearable device 402 to the device group 110, which may be stored by the wearable device 402. Subsequently, the wearer of wearable device 402 may access devices of the device group 110 without having to manually enter authentication information.

In a following set of operations, communications may be initiated between the wearable device 402 and the wearable device 404. For example, the wearable device 402 may be configured to generate a first signal that is sent as a probe to "ping" for other devices. The first signal may be generated periodically by the wearable device 402 over a local communication path, such as an electrically conductive skin surface of a user to which the wearable device 402 is attached. As illustrated in FIG. 4, such a probe signal may be sent as the message 416. The message 416 may be sent as an electrical signal over an electrically conductive surface or as a wireless signal in some examples. In some instances, such as at the time $t_2$ when the message 416 is sent, no other device may receive the message 416 or may respond to the message 416.

At a later instance shown as $t_3$ a user may don the wearable device 404 as shown. When another probe signal represented by message 418 is sent at the time $t_4$ by wearable device 402, the wearable device 404 may detect and receive the message 418 as shown in FIG. 4. As discussed above, in different implementations sending and detection of a probe signal may be carried out using electrical signals, wireless technology, near field communications, radio frequency identification (RFID) technology, or other techniques.

The wearable device 404, such as a processor in the wearable device 404, may generate a reply message 420 that identifies the wearable device 404. In one instance, the reply message 420 may be forwarded directly to the wearable device 402 for completion of authentication. Because the wearable device 402 may receive the reply message over the same local communication path as was sent the message 418, such as over a skin surface of the wearer of the wearable device 402, the wearable device may 402 determine that the wearable device 404 is under control of the wearer and therefore to be authenticated.

In the example of FIG. 4, the message 420 may be received by the device authentication module 108, which may reside within the wearable device 402. The device authentication module 108 may determine based upon one or more factors that the wearable device 404 may complete authentication. For example, the reply message 420 may additionally include information such as a serial number(s) that identifies the wearable device 402 and wearable device 404, which may aid in determining whether authentication of wearable device 404 should be completed. Alternatively, or in addition, the device authentication module 108 may identify a proximity indicator that serves to demonstrate that the wearable device 404 and wearable device 402 are attached to the same wearer (user) as discussed above. If a determination is made to complete authentication, the device authentication module 108 may forward a message 422 to other components of the wearable device 402 that contains the appropriate information to indicate that wearable device 404 is to be authenticated. For example, the message 422 may identify the wearable device 404 with a device serial number, and may include a key or other component to verify the source of the message 420.

In response, the wearable device 402 may send a return message 424 over a local communication path such as the skin surface of a user, which is received by wearable device 404. The return message 424 may include encrypted code which may be used by the wearable device 404 for automatic authentication to the device group 110.

In a subsequent operation, the user of wearable device 404 may bring the wearable device 404 into proximity of a device of the device group 110. The wearable device may send an access message 426 to a device in the device group 110. The access message 426 may include code or other information previously provided to the wearable device 404 by the wearable device 402. Given the information provided in the message 426, the device of device group 110 may determine that the wearable device 404 is to be authenticated without entry of additional information and may therefore permit the user access.

Figure 5:
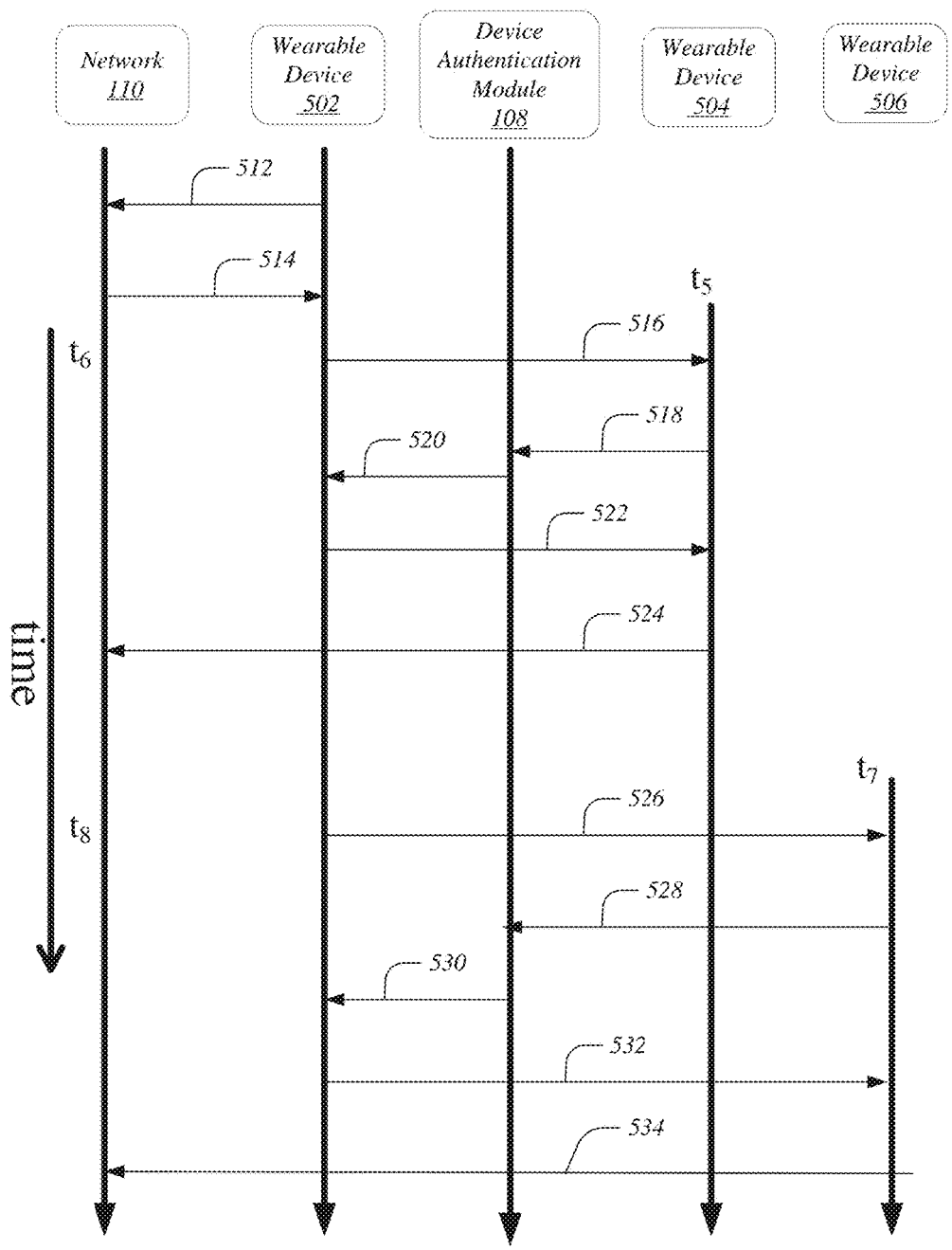
FIG. 5 provides an example of a sequence of operations to provide extended authentication in accordance with other embodiments of the disclosure.

In further embodiments, after an initial wearable device is manually authenticated to a device group, two or more additional wearable devices may be automatically authenticated to that device group. FIG. 5 provides an example of a sequence of operations for transmitting signals or communications to provide extended authentication in accordance with additional embodiments of the disclosure. An initial set of operations may be conducted as described above with respect to FIG. 4. For example, device information of three or more wearable devices may be provided to an authentication device of the device group 110.

Subsequently, a message 512 may be sent from wearable device 502 to authenticate the wearable device 502 to the device group 110. The message 512 may identify the wearable device 502 to a device that provides access to the device group 110 in one example, the message 512 may result as a consequence of authentication information that is entered manually by a user of the wearable device 502, as described above. A return message 514 may be sent from the device group 110, for example, from a computer associated with the device group. Subsequently, the wearer of wearable device 502 may access devices of the device group 110 without having to manually enter authentication information.

At a later instance shown as the time $t_5$ a user may don the wearable device 504. At a following time the wearable device 502 may be configured to generate a first signal that is sent as a probe to "ping" for other devices. As illustrated in FIG. 5, such a probe signal may be sent as the message 516 at a time $t_6$.

The wearable device 504, such as a processor in the wearable device 504, may generate a reply message 518 that identifies the wearable device 504. This may be forwarded directly to the wearable device 502 as discussed above with respect to message 420 in the embodiment of FIG. 4, and in particular may be directed to the device authentication module 108, which may reside within the wearable device 502 in one example. As discussed above with respect to FIG. 4, the device authentication module 108 may determine based on one or more factor that the wearable device 504 is to be permitted authentication and may forward a message 520 to the wearable device 502, where the message contains the appropriate information to indicate that wearable device 504 is to be authenticated. For example, the message 520 may identify the wearable device 504 with a device serial number, and may include a key or other component to verify the source of the message 518.

In response, the wearable device 502 may send a return message 522 over a local communication path such as the skin surface of a user, which is received by wearable device 504. The return message 522 may include encrypted code which may be used by the wearable device 504 for automatic authentication to the device group 110.

In a subsequent operation, the user of wearable device 504 may bring the wearable device 504 into proximity of a device of the device group 110. The wearable device 504 may send an access message 524 to a device in the device group 110. The access message 524 may include code or other information previously provided to the wearable device 504 by the wearable device 502. Given the information provided in the message 524, the device of device group 110 may determine that the wearable device 504 is to be authenticated without entry of additional information and may therefore permit the user access.

At a later instance shown as the time $t_7$ user may don the wearable device 506. At a following time the wearable device 502 may be configured to generate a first signal that is sent as a probe to "ping" for other devices. As illustrated in FIG. 5, such a probe signal may be sent as the message 516 at a time $t_8$.

The wearable device 506, such as a processor in the wearable device 506, may generate a reply message 528 that identifies the wearable device 506. This may be directed to the device authentication module 108, which may reside within the wearable device 502 in some examples. The device authentication module 108 may determine that the reply message 528, which may include encrypted information, is from a source that is to be permitted authentication. Accordingly, the device authentication module 108 may forward a message 530 to other components of the wearable device 502, where the message 530 contains the appropriate information to indicate that wearable device 506 is to be authenticated. For example, the message 530 may identify the wearable device 506 with a device serial number, and may include a key or other component to verify the source of the message 528.

In response, the wearable device 502 may send a return message 532 over a local communication path such as the skin surface of a user, which is received by wearable device 506. The return message 532 may include encrypted code which may be used by the wearable device 506 for automatic authentication to the device group 110.

In a subsequent operation, the user of wearable device 506 may bring the wearable device 506 into proximity of a device of the device group 110. The wearable device 506 may send an access message 534 to a device in the device group 110. The access message 534 may include code or other information previously provided to the wearable device 506 by the wearable device 502. Given the information provided in the message 534, the device of device group 110 may determine that the wearable device 506 is to be authenticated without entry of additional information and may therefore permit the user access.

During this time after message 534 the wearer of wearable device 502 and wearable device 504 and wearable device 506 may obtain access to devices of the device group 110 automatically without having to manually enter authentication information when the user comes into proximity of a given device of the device group 110 and the wearable device 502 or wearable device 504 or wearable device 506 is detected.

Figure 6:
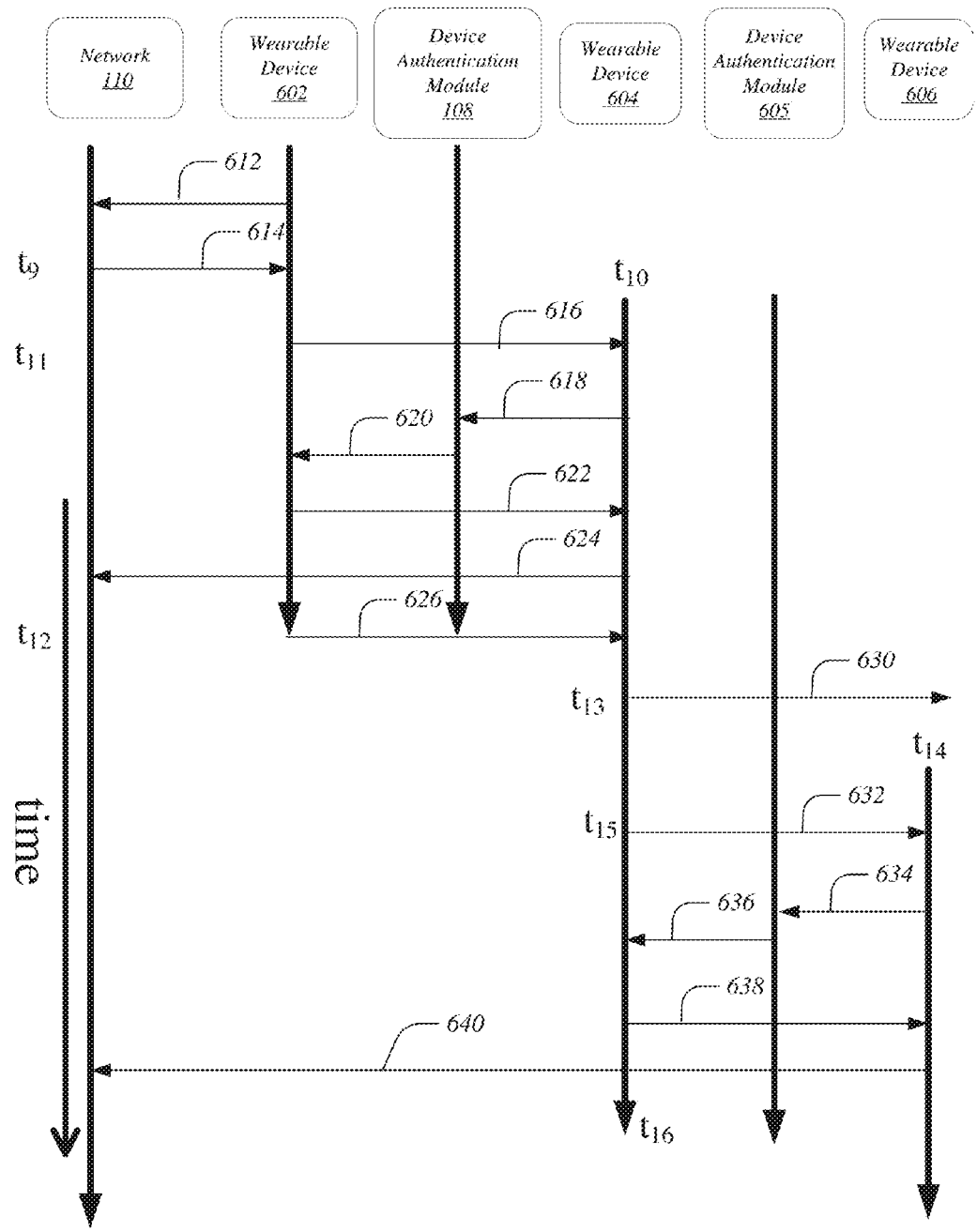
FIG. 6 provides an example of a sequence of operations to provide extended authentication in accordance with additional embodiments of the disclosure.

FIG. 6 provides another example of a sequence of operations for transmitting signals or communications to provide extended authentication in accordance with other embodiments of the disclosure. In the example of FIG. 4 there are shown three different wearable devices, wearable device 602 and wearable device 604, and wearable device 606, which may be configured similarly to the wearable device 304 discussed above. As illustrated time proceeds from top to bottom of the figure.

In the scenario of FIG. 6 it may be assumed that the wearable device 602 and wearable device 604 and wearable device 606 may be registered with a system that provides access to devices of the device group 110, which may represent any device associated with the device group 110 or all devices of the device group 110. For example, a user may register using a personal computer or other device a first serial number associated with the wearable device 602 and a second serial number associated with the wearable device 604 and a third serial number associated with wearable device 606. In some cases the wearable device 602 and wearable device 604 and wearable device 606 may be provided with information such as a decryption key to be used in communications to facilitate access to the device group 110 while preventing other unwanted devices from access to the device group 110.

After these preliminary tasks are performed, when a user subsequently wishes to establish convenient access to devices of the device group 110, an initial set of operations may be performed to authenticate a wearable device to the device group 110.

For example, a message 612 may be sent from wearable device 602 to authenticate the wearable device 602 to the device group 110. The message 612 may identify the wearable device 602 to a device that provides access to the device group 110 in one example. The message 612 may result as a consequence of authentication information that is entered manually by a user of the wearable device 602, as described above. A return message 614 may be sent from the device group 110, for example, from a computer associated with the device group. The return message 614 that is sent at time $t_9$ may complete authentication of the wearable device 602 to the device group 110. Subsequently, the wearer of wearable device 602 may access devices of the device group 110 without having to manually enter authentication information.

At a subsequent time $t_{10}$ the wearer of wearable device 602 may don a wearable device 604 as shown. As in previous examples, the wearable device 602 may be configured to generate a first signal that is sent as a probe to "ping" for other devices. As illustrated in FIG. 6, such a probe signal may be sent as the message 616 at the time $t_{11}$ that is received by the wearable device 604.

The wearable device 604, such as a processor in the wearable device 604, may generate a reply message 618 that identifies the wearable device. This may be forwarded directly to the wearable device 602 as discussed above with respect to message 420 in the embodiment of FIG. 4, and in particular may be directed to the device authentication module 108, which may reside within the wearable device 602. Accordingly, the device authentication module 108 may determine that the wearable device 604 is to be authenticated and may forward a message 620 to other components in the wearable device 602, where the message 620 contains the appropriate information to indicate that wearable device 604 is to be authenticated.

In response, the wearable device 602 may send a return message 622 over a local communication path such as the skin surface of a user, which is received by wearable device 604. The return message 624 may include encrypted code which may be used by the wearable device 604 for automatic authentication to the device group 110.

In a subsequent operation, the user of wearable device 604 may bring the wearable device 604 into proximity of a device of the device group 110. The wearable device may send an access message 624 to a device in the device group 110. The access message 624 may include code or other information previously provided to the wearable device 604 by the wearable device 602. Given the information provided in the message 624, the device of device group 110 may determine that the wearable device 604 is to be authenticated without entry of additional information and may therefore permit the user access.

During this time after message 624 the wearer of wearable device 602 and wearable device 604 may obtain access to devices of the device group 110 automatically without having to manually enter authentication information when the user comes into proximity of a given device of the device group 110 and the wearable device 602 or wearable device 604 is detected.

At a later instance shown as the time $t_{12}$ a user may remove the wearable device 602 or otherwise undo the wearable device 602. For example, in a variant in which the wearable device 602 is a wrist mounted device having a clasp, the wearable device 602 may be unclasped and placed unclasped in a pocket. At this point with the wearable device in an unclasped configuration automatic authentication to the device group 110 via the wearable device 602 may be terminated. Accordingly, the wearer of wearable device 604 may automatically authenticate to devices of the device group 110 using the wearable device 604 but not via the wearable device 602.

In the embodiment depicted in FIG. 6 in order to facilitate extended authentication, the wearable device 604 may also be configured to generate a probe signal to probe for other devices, such as other wearable devices. This probe signal may be sent out periodically in some embodiments. In addition, when the wearable device 602 is removed, the removal of wearable device 602 may trigger the wearable device 602 to output a signal shown as message 626. In embodiments in which the wearable device 602 has electrical leads that couple to the skin surface of a wearer, the message 626 may constitute the removal of periodic electrical pulse. In other embodiments, the message 626 may be a wireless signal. In either case, the message may be received by other devices, including the wearable device 604. In the example illustrated in FIG. 6, the wearable device 604 may be triggered to output its own probe signal after receipt of the message 626, if the wearable device 604 was not already configured to output a probe signal when worn. For example, the message 626 may be received by wearable device 604, such as by a processor in the wearable device 604, which may trigger the wearable device 604 to generate a probe signal at the time $t_{13}$ which is shown as message 630. The message 630 may not be received by other wearable devices if none other are present.

Subsequently at the time $t_{14}$ a user (wearer) of wearable device 604 may don the wearable device 606. The wearable device 604 may continue to periodically output a probe signal, such that a message 632 is sent at a later instance $t_{14}$ such that the message is received by the wearable device 606.

The wearable device 606, such as a processor in the wearable device 606, may generate a reply message 634 that identifies the wearable device 606. This may be forwarded directly to the wearable device 604 as discussed above with respect to message 420 in the embodiment of FIG. 4, or may be directed to a device authentication module 605, which may reside within the wearable device 604 in some examples. Accordingly, the device authentication module 605 may determine that the wearable device 606 is to be authenticated and may forward a message 636 to other components of the wearable device 604, which message 636 may contain the appropriate information to indicate that wearable device 606 is to be authenticated. For example, the message 636 may identify the wearable device 606 with a device serial number, and may include a key or other component to verify the source of the message 634.

In response, the wearable device 604 may send a return message 638 over a local communication path such as the skin surface of a user, which is received by wearable device 606. The return message 638 may include encrypted code which may be used by the wearable device 606 for automatic authentication to the device group 110.

In a subsequent operation, the wearer of wearable device 606 may bring the wearable device 606 into proximity of a device of the device group 110. The wearable device 606 may send an access message 640 to a device in the device group 110. The access message 640 may include code or other information previously provided to the wearable device 606 by the wearable device 604. Given the information provided in the message 640, the device of device group 110 may determine that the wearable device 606 is to be authenticated without entry of additional information and may therefore permit the user access.

During this time after message 640 the wearer of wearable device 604 and wearable device 606 may obtain access to devices of the device group 110 automatically without having to manually enter authentication information when the user comes into proximity of a given device of the device group 110 and the wearable device 604 or wearable device 606 is detected.

At a later instance shown as the time $t_{16}$ a user may remove the wearable device 604 or otherwise undo the wearable device 604. At this point with the wearable device automatic authentication to the device group 110 via the wearable device 604 may be terminated. Accordingly, the wearer of wearable device 604 may automatically authenticate to devices of the device group 110 using the wearable device 606 but not via the wearable device 604.

Subsequently, the wearable device 606 may generate probe signals, which may result in authentication of another wearable device when that other wearable device is donned by the wearer of wearable device 606. In the above manner, a chain of authentication that provides automatic authentication to the device group 110 may be maintained by the wearer of the wearable device 602, wearable device 604, and wearable device 606, so long at least one wearable device maintains its authenticated status at any given time.

In additional embodiments, extended authentication to a group of devices using wearable devices may be provided in a semi-automated manner. For example, during a sequence of operations for extending authentication a first wearable device that is already authenticated to a device group may detect a second wearable device. Both wearable devices may be worn by the same user in many use scenarios. After the second wearable device receives authentication information from the first device as outlined in the above embodiments, instead of automatically completing authentication, a device authentication module may schedule a message or query to be presented on the second wearable device. For example, a display or other user interface on the second wearable device may present a message asking if the second wearable device is to be authenticated. User input received from a user interface of the second wearable device that indicates whether or not the second wearable device is to be authenticated may then be received by the device authentication module and acted upon accordingly. If the user input is affirmative, then the device authentication module may send a signal to complete authentication. The second wearable device may then store the appropriate authentication information needed to automatically access a device group and may configure the appropriate components of the second wearable device to communicate with a device of the device group when access to that device is to take place.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
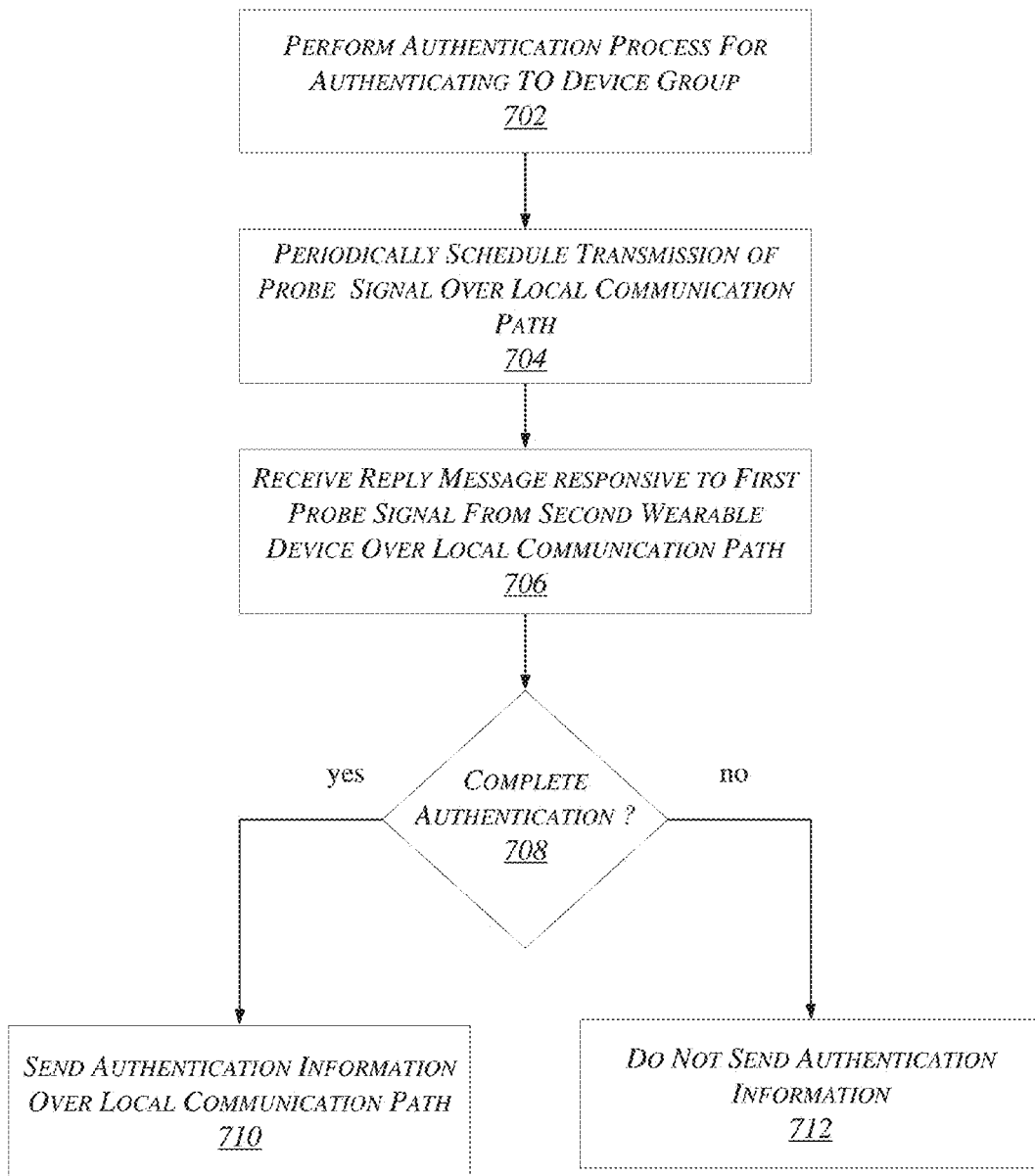
FIG. 7 shows an exemplary first logic flow.

FIG. 7 illustrates an exemplary first logic flow 700. In some examples, the logic flow 700 may be implemented in a wearable device that is configured to communicate with other devices to provide access to the other devices. At block 702, an authentication process is performed to authenticate a wearable device to a device group. At block 704, a probe signal is periodically scheduled for transmission over a local communications path, such as an electrically conductive surface or wireless link.

At block 706 a reply message is received from a second device over the local communication path that is responsive to the probe signal. At decision block 708 a determination is made as to whether to complete authentication for the second device. The decision may be made based upon criteria such as device identifier information or proximity indicator provided in the reply message. The decision may optionally be based upon user input received through a user interface which user input may be solicited in a query message as discussed above. If so, the flow proceeds to block 710, where authentication information is transmitted over the local communications path. If not, the flow proceeds to block 712, in which authentication information is not sent.

Figure 8:
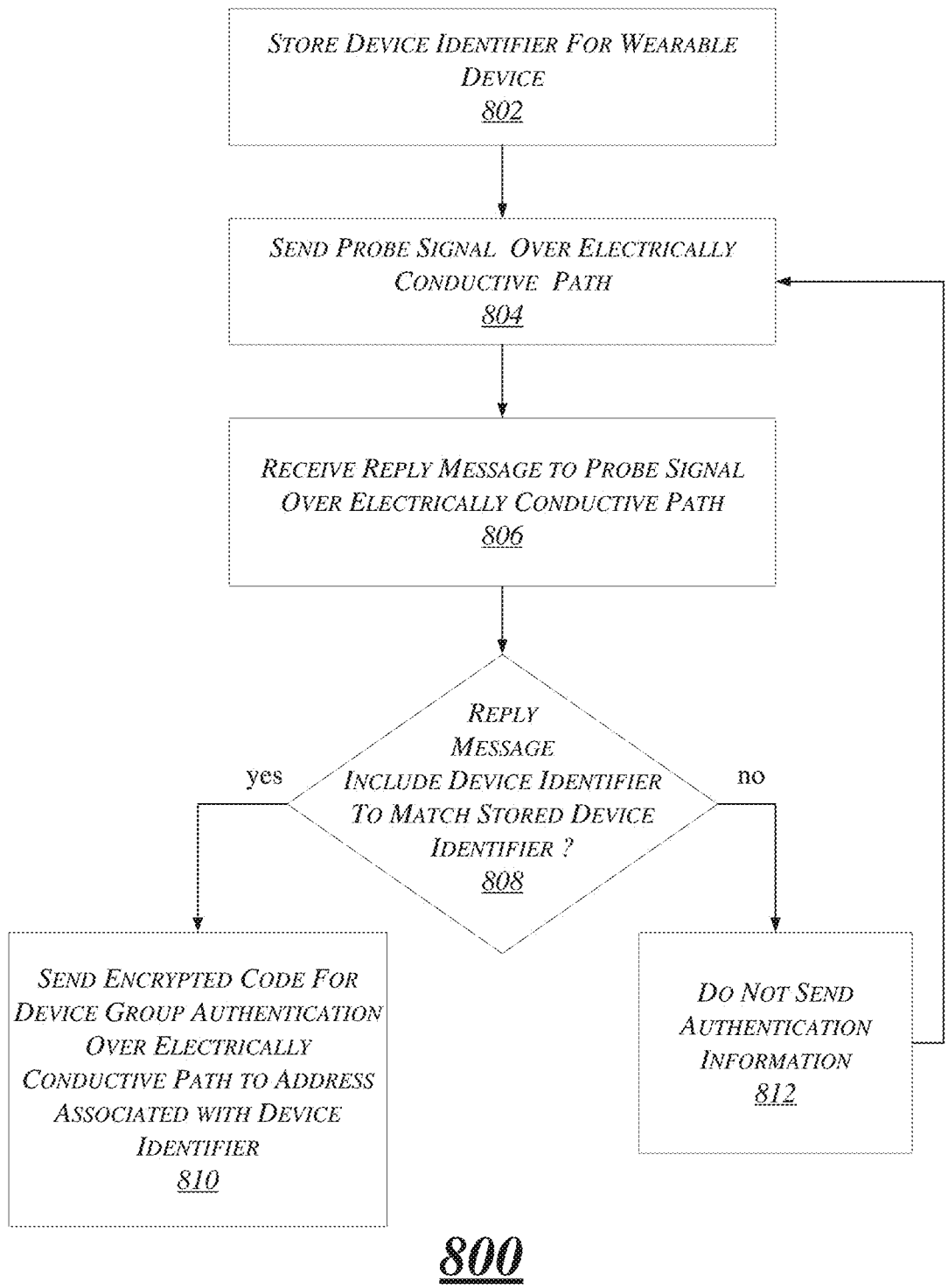
FIG. 8 shows an exemplary second logic flow.

FIG. 8 illustrates an exemplary second logic flow 800. In some examples, the logic flow 800 may be implemented in a wearable device that is configured to communicate with other devices to provide access to the other devices. At block 802, a device identifier is stored for a wearable device.

At block 804, a probe signal is sent over an electrically conductive path. At block 806 a reply message is received over the electrically conductive path to the probe signal.

At decision block 808 a determination is made as to whether the reply message includes a device identifier that matches the stored device identifier for the wearable device. If so, the flow proceeds to block 810 where encrypted code that may be used for authentication to the device group is sent over the electrically conductive path to an address associated with the device identifier.

If not, the flow proceeds to block 812, where no authentication information is sent. The flow may then return to block 804.

Figure 9:
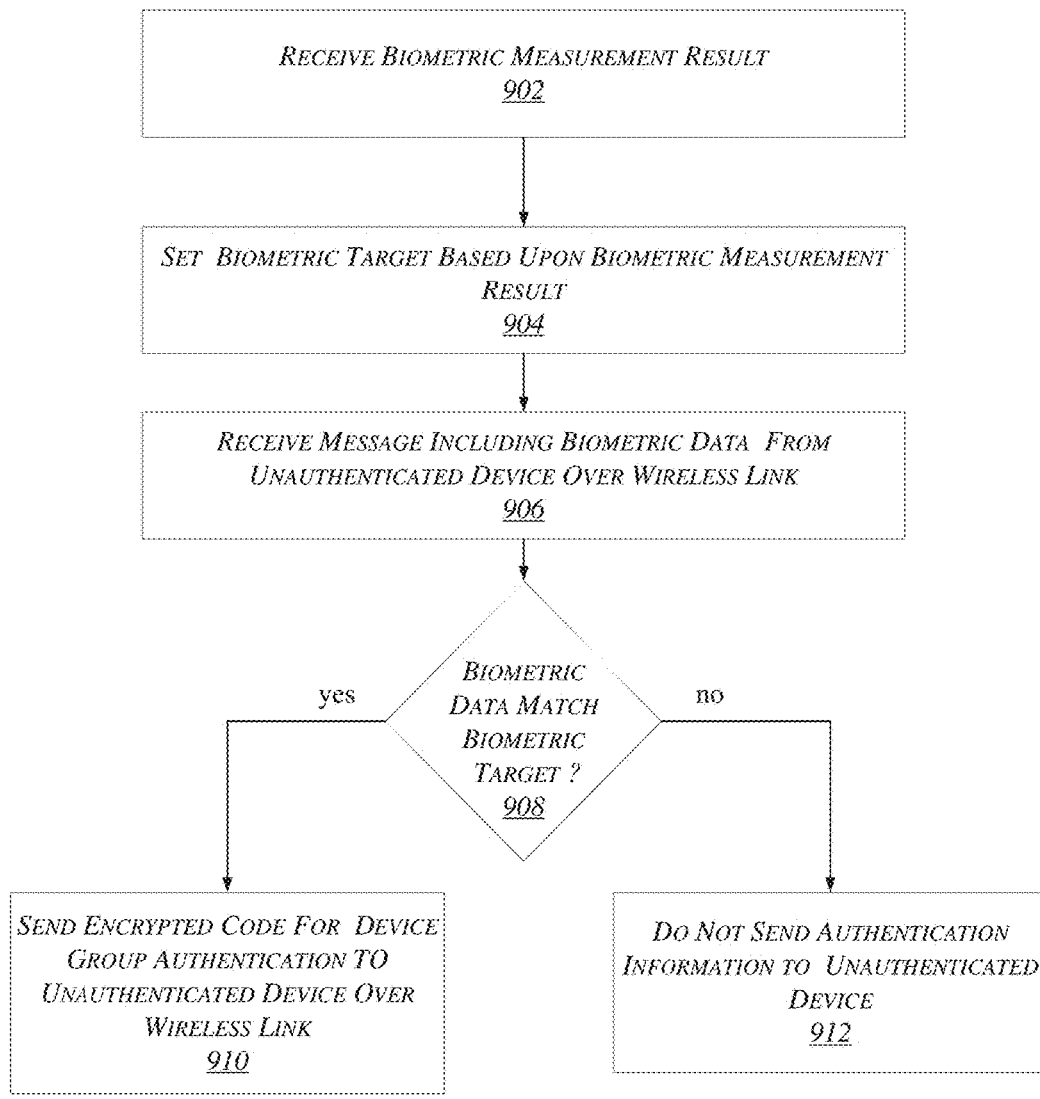
FIG. 9 shows an exemplary third logic flow.

FIG. 9 illustrates an exemplary third logic flow 900. In some examples, the logic flow 900 may be implemented in a first wearable device that is configured to communicate with other devices to provide access to the other devices. At block 902, a biometric measurement result is received. The biometric measurement result may be based upon a measurement from a sensor in the first wearable device.

At block 904 a biometric target is set based upon the biometric measurement result. The biometric target may be a heart rhythm in one example.

At block 906, a message is received over a wireless link that includes biometric data, where the message is received from an unauthenticated device. The unauthenticated device may be a second wearable device that is equipped with a sensor or sensors to perform a biometric measurement. The message may be generated in response to a probe signal generated by the first wearable device.

At decision block 908 a determination is made as to whether the biometric data received in the message matches the biometric target. If so, the flow proceeds to block 910 where encrypted code is sent to an address associated with the unauthenticated device over the wireless link, where the encrypted code may be for authentication to the device group. If not, the flow proceeds to block 912, where the decision is made not to send authentication information to the unauthenticated device.

Figure 10:
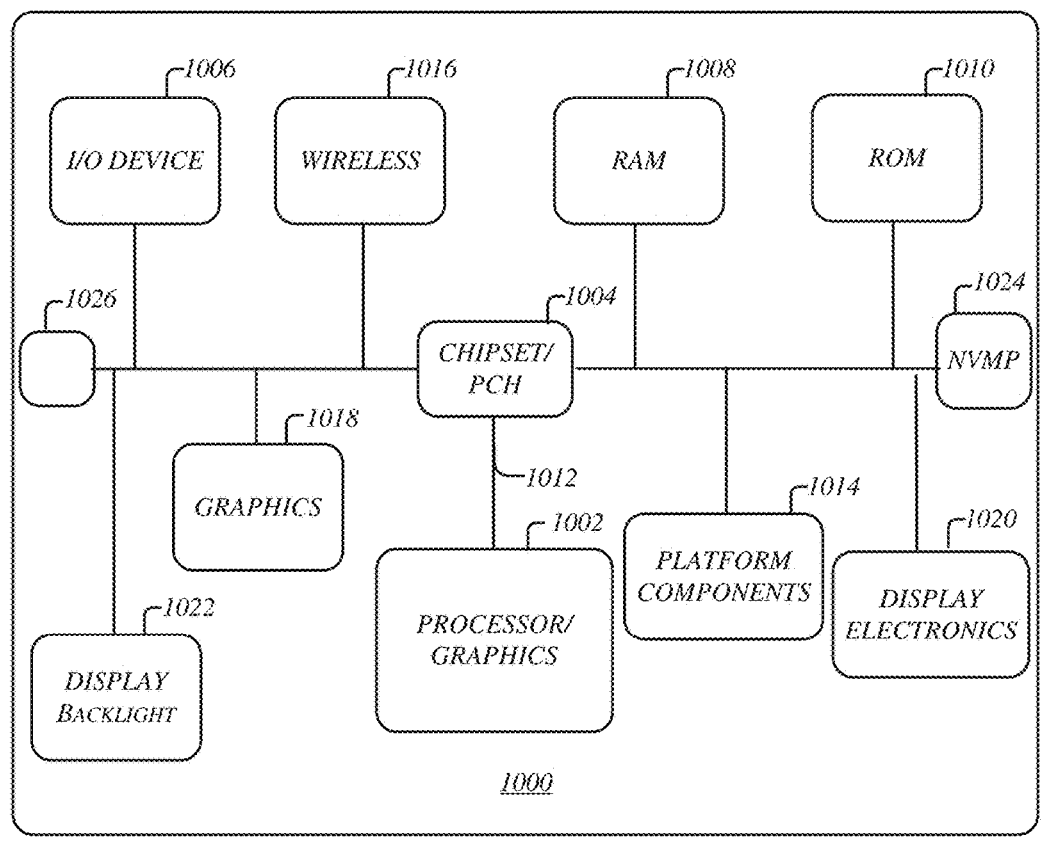
FIG. 10 illustrates an exemplary system architecture.

FIG. 10 is a diagram of an exemplary system embodiment and in particular, FIG. 10 is a diagram showing a system 1000, which may include various elements. For instance, FIG. 10 shows that system (platform) 1000 may include a processor/graphics core, termed herein processor 1002, a chipset/platform control hub (PCH), termed herein chipset 1004, an input/output (I/O) device 1006, a random access memory (RAM) (such as dynamic RAM (DRAM)) 1008, and a read only memory (ROM) 1010, display electronics 1020, display backlight 1022, and various other platform components 1014 (e.g., a fan, a crossflow blower, a heat sink, DTM system, cooling system, housing, vents, and so forth). System 1000 may also include wireless communications chip 1016 and graphics device 1018, non-volatile memory port (NVMP) 1024, and antenna 1026. The embodiments, however, are not limited to these elements.

As shown in FIG. 10, I/O device 1006, RAM 1008, and ROM 1010 are coupled to processor 1002 by way OF Chipset 1004. Chipset 1004 may be coupled to processor 1002 by a bus 1012. Accordingly, bus 1012 may include multiple lines.

Processor 1002 may be a central processing unit comprising one or more processor cores and may include any number of processors having any number of processor cores. The processor 1002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1002 may be multiple separate processors located on separate integrated circuit chips. In some embodiments processor 1002 may be a processor having integrated graphics, while in other embodiments processor 1002 may be a graphics core or cores. Commands can be provided to processor 1002, for example, through keyboard, touch screen interaction, gestures, facial expressions, and sounds.

The following examples pertain to further embodiments. Example 1 is an apparatus that may include a memory to store authentication information for authenticating to a device group and to store a wearable device identifier for an unauthenticated device; a communications interface to transmit a probe signal over a local communication path and receive a reply message responsive to the probe signal; and a device authentication module to monitor the reply message, and schedule transmission of the authentication information over the local communication path when the reply message comprises the device identifier and a proximity indicator that identifies a local origin of the reply message.

In example 2, the authentication information of example 1 may comprise encrypted code.

In example 3, the device authentication module of any of claims 1 to 2 may be to schedule the authentication information for transmission to an address associated with the device identifier.

In example 4, the local communication path of any of examples 1 to 3 may comprise an electrically conductive surface, and the proximity indicator comprising a set of electrical signals received over the electrically conductive surface.

In example 5, the device authentication module of any of examples 1 to 4 may be to generate a user query responsive to receipt of the reply message, and schedule transmission of the authentication information when a user authorization message is received responsive to the user query.

In example 6, the proximity indicator of any of examples 1 to 5 may comprise biometric data received in the reply message.

In example 7, the local communication path of any of examples 1 to 6 may comprise a wireless communication link.

In example 8, the apparatus of any of examples 1 to 7 may comprise a sensor to produce a biometric measurement result, the device authentication module to set a biometric target based upon the biometric measurement result.

In example 9, the apparatus of any of examples 1 to 8 may comprise a wearable interface component operative to generate an operation signal when in an operating configuration.

In example 10 the apparatus of any of examples 1 to 9 may comprise logic to generate the probe signal when the operation signal is received.

In example 11 the apparatus of any of examples 1 to 10 may comprise logic to generate scanning for a signal over the communication interface when the operation signal is received.

Example 12 includes at least one machine-readable storage medium comprising instructions that when executed by a computing device, cause the computing device to: receive authentication information for authenticating to a device group and a wearable device identifier of an unauthenticated device; monitor a reply message that is received over a local communication path; and schedule the authentication information for transmission over the local communication path when the reply message comprises a device identifier and a proximity indicator that identifies a local origin of the reply message.

In example 13, the authentication information of example 12 may comprise comprising encrypted code.

In Example 14, the proximity indicator of any of examples 12 to 13 may include a set of electrical signals received over an electrically conductive surface.

In example 15. the at least one machine-readable storage medium of any of examples 12 to 14 may include instructions that when executed by a computing device, cause the computing device to generate a user query responsive to receipt of the reply message, and schedule transmission of the authentication information when a user authorization message is received responsive to the user query.

In example 16, the proximity indicator of any of examples 12 to 15 may include biometric data received in the reply message.

In example 17, the at least one machine-readable storage medium of any of examples 12 to 16 may include instructions that when executed by a computing device, cause the computing device to schedule a biometric measurement, set a biometric target based upon a biometric measurement result, and schedule the authentication information for transmission over the local communication path when the reply message includes biometric data that provides a match to the biometric target.

Example 18 is a computer implemented method that may include receiving authentication information for authenticating to a device group and a wearable device identifier for an unauthenticated device; monitoring a reply message that is received over a local communication path; and scheduling the authentication information for transmission over the local communication path when the reply message comprises a device identifier and a proximity indicator that identifies a local origin of the reply message.

In example 19, the proximity indicator of example 18 may include a set of electrical signals received over an electrically conductive surface.

In example 20, the computer implemented method of any of examples 18 to 19 may include generating a user query responsive to receipt of the reply message, and scheduling transmission of the authentication information when a user authorization message is received responsive to the user query.

In example 21, the proximity indicator of any of examples 18 to 20 may include biometric data received in the reply message.

In example 22, the computer implemented method of any of examples 18 to 21 may include scheduling a biometric measurement, setting a biometric target based upon a biometric measurement result; and scheduling the authentication information for transmission over the local communication path when the reply message includes biometric data that provides a match to the biometric target.

In example 23, the computer implemented method of any of examples 18 to 22 may include: receiving a probe signal over the local communication path; generating a second reply message comprising a second device identifier over the local communication path; and receiving the authentication information over the local communication path.

Example 24 is user equipment to extend authentication comprising means to perform the method of any of examples 18 to 23.

Example 25 is an apparatus to extend authentication comprising means to perform the method of any one of examples 18 to 23.

In example 26, a system to extend authentication may include a memory to store authentication information for authenticating to a device group and to store a wearable device identifier for an unauthenticated device; a communications interface to transmit a probe signal over a local communication path and receive a reply message responsive to the probe signal; a user interface to receive user input; and a device authentication module to monitor the reply message, and schedule transmission of the authentication information over the local communication path when the reply message comprises the device identifier and a proximity indicator that identifies a local origin of the reply message.

In example 27, the authentication information of example 26 may include encrypted code.

In example 28, the device authentication module of any of examples 26 to 27 may be to schedule the authentication information for transmission to an address associated with the device identifier.

In example 29, the local communication path of any of examples 26 to 28 may include an electrically conductive surface, and the proximity indicator may include a set of electrical signals received over the electrically conductive surface.

In example 30, the device authentication module of any of examples 26 to 29 may be to generate a user query responsive to receipt of the reply message, and schedule transmission of the authentication information when a user authorization message is received from the user interface responsive to the user query.

In example 31 the proximity indicator of any of examples 26 to 30 may include biometric data received in the reply message.

In example 32 the local communication path of any of examples 26 to 31 may include comprising a wireless communication link.

In example 33, system of any of examples 26 to 32 may include a sensor to produce a biometric measurement result, and the device authentication module may be to set a biometric target based upon the biometric measurement result.

In example 34, the system of any of examples 26 to 33 may include a wearable interface component operative to generate an operation signal when in an operating configuration.

In example 35, the system of any of examples 26 to 34 may include logic to generate the probe signal when the operation signal is received.

In example 36, the system of any of examples 26 to 35 may include logic to generate scanning for a signal over the communication interface when the operation signal is received.

The embodiments, as previously described, may be implemented using various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In some embodiments, an element is defined as a specific structure performing one or more operations. It may be appreciated, however, that any element defined as a specific structure performing a specific function may be expressed as a means or step for performing the specified function without the recital of structure, material, or acts in support thereof, and such means or step is meant to cover the corresponding structure, material, or acts described in the detailed description and equivalents thereof. The embodiments are not limited in this context.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
a processor;
a communication interface coupled to the processor;
a local communication path interface coupled to the processor; and
memory coupled to the processor, the memory comprising a device identifier and instructions that when executed by the processor cause the processor to:
transmit, via the communication interface, a message to a device group authentication device, the message comprising an indication of the device identifier;
receive, via the communication interface, a return message from the device group authentication device, the return message comprising an indication of authentication information for the device group, the authentication information to allow communication, via the communication interface, with one or more devices of the device group without manually entering authentication information;
transmit, over a local communication path via the local communication path interface, a first probe signal, the first probe signal to ping for additional devices to authenticate to the device group;
receive, over the local communication path via the local communication path interface, a reply message from an additional device, the reply message responsive to the first probe signal;
determine whether the additional device is proximate to the apparatus based at least in part on the local communication path and the reply message; and transmit, over the local communication path via the local communication path interface, an authentication message based on a determination that the additional device is proximate to the apparatus, the authentication message comprising the indication of the authentication information to allow the additional device to communicate, via the communication interface, with one or more devices of the device group without manually entering authentication information.

2. The apparatus of claim 1, the local communication path comprising an electrically conductive surface.

3. The apparatus of claim 2, the electrical conductive surface is a skin surface of a user of the apparatus and the additional device.

4. The apparatus of claim 1, the memory comprising instructions that when executed by the processor further cause the processor to:
generate a user query responsive to receipt of the reply message;
receive a user authorization message responsive to the user query; and
transmit the authentication message responsive to the determination that the additional device is proximate to the apparatus or responsive to receiving the user authorization message.

5. The apparatus of claim 1, the memory comprising instructions that when executed by the processor further cause the processor to generate an operation signal when in an operating configuration.

6. The apparatus of claim 5, the memory comprising instructions that when executed by the processor further cause the processor to generate the first probe signal when the operation signal is received.

7. The apparatus of claim 5, the memory comprising instructions that when executed by the processor further cause the processor to repeatedly scan for a signal over the local communication path interface when the operation signal is received.

8. The apparatus of claim 1, the memory comprising instructions that when executed by the processor further cause the processor to:
transmit, via the local communication path interface, a second probe signal over a local communication path, the second probe signal to ping for additional devices to authenticate to the device group;
receive, over the local communication path via the local communication path interface, a reply message from a second additional device;
determine whether to authenticate the second additional device to the device group based in part on the reply message; and
transmit, over the local communication path via the local communication path interface, an second authentication message based on a determination to authenticate the second additional device to the device group, the second authentication message comprising an indication of the authentication information to allow the second additional device to communicate with one or more devices of the device group without manually entering authentication information.

9. The apparatus of claim 8, the reply message from the second additional device comprising an indication of biometric information, the memory comprising instructions that when executed by the processor further cause the processor to determine whether to authenticate the second additional device to the device group based in part on the biometric information.

10. At least one non-transitory machine-readable storage medium comprising instructions that when executed by a processor at a computing device, cause the processor to:
transmit, via a communication interface, a message to a device group authentication device, the message comprising an indication of a device identifier for the computing device;
receive, via the communication interface, a return message from the device group authentication device, the return message comprising an indication of authentication information for the device group, the authentication information to allow communication, via the communication interface, with one or more devices of the device group without manually entering authentication information;
transmit, over a local communication path via a local communication path interface, a first probe signal, the first probe signal to ping for additional devices to authenticate to the device group;
receive, over the local communication path via the local communication path interface, a reply message from an additional device;
determine whether the additional device is proximate to the computing device based at least in part on the local communication path and the reply message; and
transmit, over the local communication path via the local communication path interface, an authentication message based on a determination that the additional device is proximate to the computing device, the authentication message comprising the indication of the authentication information to allow the additional device to communicate, via the communication interface, with one or more devices of the device group without manually entering authentication information.

11. The at least one non-transitory machine-readable storage medium of claim 10, the local communication path comprising an electrically conductive surface.

12. The at least one non-transitory machine-readable storage medium of claim 11, the electrically conductive surface is a skin surface of a user of the computing device and the additional device.

13. The at least one non-transitory machine-readable storage medium of claim 10, comprising instructions that when executed by the computing device, cause the computing device to:
generate a user query responsive to receipt of the reply message;
receive a user authorization message responsive to the user query; and
transmit the authentication message responsive to the determination that the additional device is proximate to the apparatus or responsive to receiving the user authorization message.

14. The at least one non-transitory machine-readable storage medium of claim 10, the comprising instructions that when executed by the computing device further cause the computing device to:
transmit, via the local communication path interface, a second probe signal over a local communication path, the second probe signal to ping for additional devices to authenticate to the device group;
receive, over the local communication path via the local communication path interface, a reply message from a second additional device;

determine whether to authenticate the second additional device to the device group based in part on the reply message; and transmit, over the local communication path via the local communication path interface, an second authentication message based on a determination to authenticate the second additional device to the device group, the second authentication message comprising an indication of the authentication information to allow the second additional device to communicate with one or more devices of the device group without manually entering authentication information.

15. The at least one non-transitory machine-readable storage medium of claim 14, the reply message from the second additional device comprising an indication of biometric information, the medium comprising instructions that when executed by the computing device further cause the computing device to determine whether to authenticate the second additional device to the device group based in part on the biometric information.

16. A computer implemented method, comprising:

transmitting, from a computing device via a communication interface, a message to a device group authentication device, the message comprising an indication of a device identifier for the computing device;

receiving, at the computing device via the communication interface, a return message from the device group authentication device, the return message comprising an indication of authentication information for the device group, the authentication information to allow communication, via the communication interface, with one or more devices of the device group without manually entering authentication information;

transmitting, over a local communication path via a local communication path interface, a first probe signal to ping for additional devices to authenticate to the device group;

receiving, over the local communication path via the local communication path interface, a reply message from an additional device;

determining whether the additional device is proximate to the computing device based at least in part on the local communication path and the reply message; and transmitting, over the local communication path via the local communication path interface, an authentication message based on a determination that the additional device is proximate to the computing device, the authentication message comprising the indication of the authentication information to allow the additional device to communicate, via the communication interface, with one or more devices of the device group without manually entering authentication information.

17. The computer implemented method of claim 16, the local communication path comprising an electrically conductive surface.

18. The computer implemented method of claim 17, the electrically conductive surface is a skin surface of a user of the computing device and the additional device.

19. The computer implemented method of claim 16, comprising:

generating a user query responsive to receipt of the reply message;

receiving a user authorization message responsive to the user query; and transmitting the authentication message responsive to the determination that the additional device is proximate to the apparatus or responsive to receiving the user authorization message.

20. The computer implemented method of claim 16, comprising:

transmitting, via the local communication path interface, a second probe signal over a local communication path, the second probe signal to ping for additional devices to authenticate to the device group;

receiving, over the local communication path via the local communication path interface, a reply message from a second additional device;

determining whether to authenticate the second additional device to the device group based in part on the reply message; and transmitting, over the local communication path via the local communication path interface, an second authentication message based on a determination to authenticate the second additional device to the device group, the second authentication message comprising an indication of the authentication information to allow the second additional device to communicate with one or more devices of the device group without manually entering authentication information.

21. The computer implemented method of claim 20, the reply message from the second additional device comprising an indication of biometric information, the method comprising determining whether to authenticate the second additional device to the device group based in part on the biometric information.

* * * * *